Feb. 17, 1970 D. E. GRIFFEY 3,496,446

PROTECTION CIRCUIT FOR A TELEVISION RECEIVER

Filed Dec. 26, 1967

Inventor
DONALD E. GRIFFEY
BY Mueller, Aichele & Rauner
ATTYS.

United States Patent Office
3,496,446
Patented Feb. 17, 1970

3,496,446
PROTECTION CIRCUIT FOR A TELEVISION RECEIVER

Donald E. Griffey, Skokie, Ill., assignor to Motorola, Inc., Franklin Park, Ill., a corporation of Illinois Filed Dec. 26, 1967, Ser. No. 693,463
Int. Cl. H02h 7/10
U.S. Cl. 321—11 9 Claims

ABSTRACT OF THE DISCLOSURE

The power supply of a television receiver having the "instant-on" feature includes a low impedance path coupled across the secondary winding of the power transformer to provide a low impedance path for high voltage transient pulses. The low impedance path prevents buildup of destructive voltages across the rectifying diodes of the power supply.

BACKGROUND OF THE INVENTION

Figure 1:
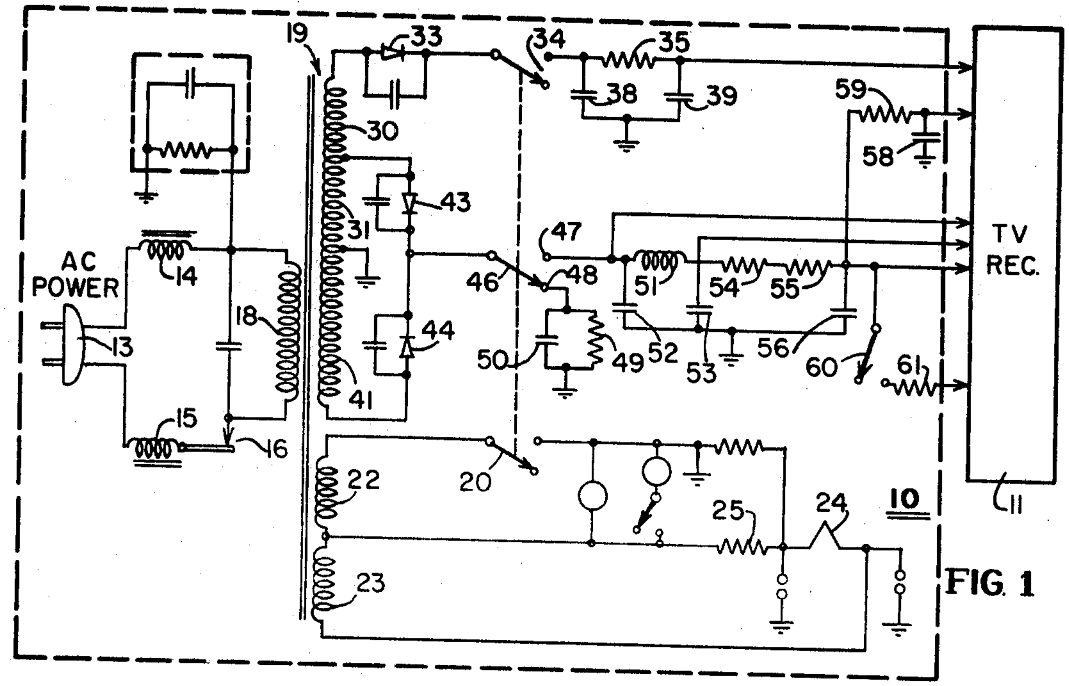

A desirable feature in television sets is the ability to develop a picture and sound as soon as the set is turned on. This eliminates the relatively long and frustrating warm up period during which no television picture or sound is present. This "instant-on" feature in television sets has been accomplished by maintaining a reduced current flow through the filaments of the television set tubes during the time that the set is in the "off" condition. The "instant-on" feature is particularly adapted to transistor sets since the only filament which requires a reduced current during the "off" period is the picture tube filament. Thus, with a transistor set, the power consumption is very low even though the set is not turned completely off.

In previous television sets not incorporating the "instant-on" feature, a switch was placed in series with the primary winding of the power transformer in order to turn off the set. Opening this switch cuts off power to the set and also decouples the power transformer from the power line. With sets having the "instant-on" feature the primary winding must remain coupled to the powei line at all times and the switches used to turn the television set "off" must be placed in the secondary circuit. With the power line coupled to the power transformer transients appearing on the power line, such as are caused by lightning, will be coupled to the secondary windings and will appear as high voltage pulses across the rectifying diodes. These high voltage pulses have a duration of from two to three cycles of the alternating current of the power supply and are sufficient to damage and destroy the power rectifier diodes.

SUMMARY OF THE INVENTION

It is, therefore, an object of this invention to provide a television set power supply incorporating an "instant-on" circuit with protection against damage of the power rectifier diodes by transients.

Another object of this invention is to prevent the buildup of high voltages in the secondary of a power supply transformer as a result of high voltage transient pulses on a power line.

In practicing this invention a low impedance path is coupled across the secondary of the power transformer to provide a path for current developed by high voltage transient pulses to flow through the winding of the transformer. The flow of current through the low impedance path prevents the buildup of a high voltage across the path prevents build up of a high voltage across the rectifying diodes. The low impedance path may consist of a capacitor coupled between the output of the rectifying diodes and the secondary winding of the power transformer. A switch may be used to connect the low impedance capacitor into the circuit when the power supply is turned "off" or the capacitor may be permanently connected.

Figure 2:
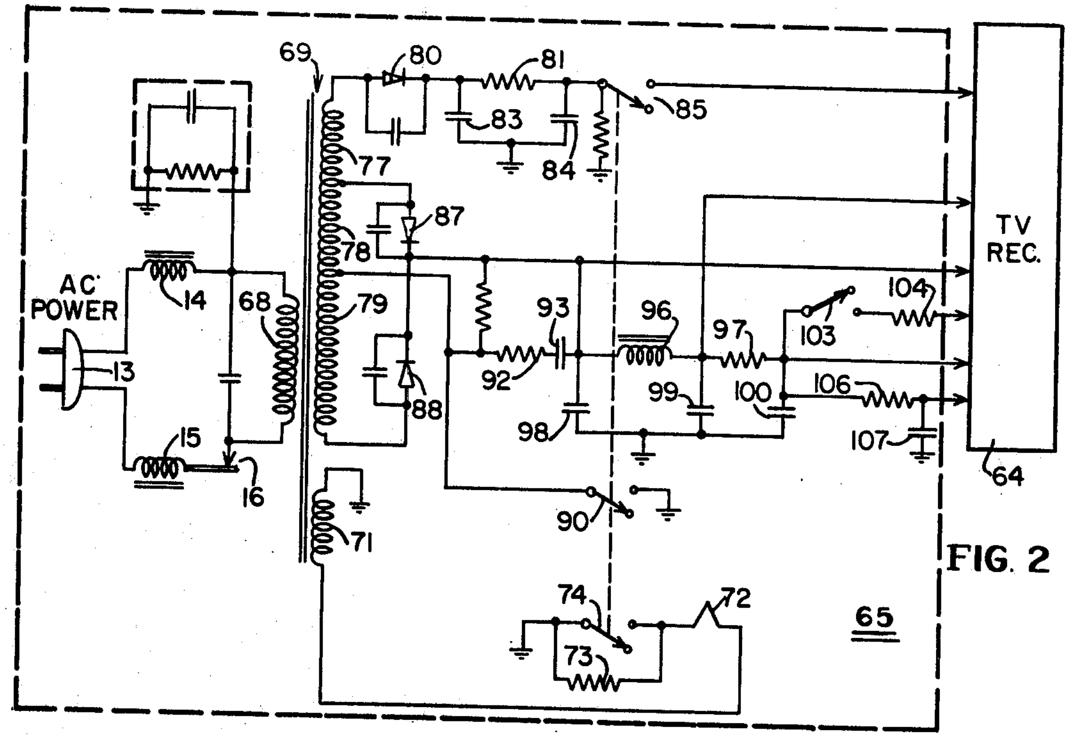

The invention is illustrated in the drawings of which:

FIG. 1 is a schematic of a power supply for a television receiver incorporating the protection circuit of the invention; and FIG. 2 is a schematic of another embodiment of a protection circuit for a television receiver power supply.

DESCRIPTION OF THE INVENTION

Referring to FIG. 1, a plug 13 is adapted to be connected to the alternating current power line. Power received by plug 13 is coupled to primary winding 18 of transformer 19 through filter coils 14, 15 and circuit breaker 16. Transformer 19 provides the various voltages required by television receiver 11. In the circuit of FIG. 1 primary winding 18 is always connected to the power lines, even when the set is turned off.

Secondary winding 23 of transformer 19 provides AC filament power to the heater 24 of the cathode ray tube used by television receiver 11. Television receiver 11 is a transistorized receiver and therefore the only filament power required is the power for the cathode ray tube, however this invention is not limited to a transistorized set. In order to provide the "instant-on" feature in the television set, heater 24 is permanently connected across secondary winding 23 of transformer 29 through resistor 25. Thus heating power is applied to filament 24 of cathode ray tube as long as plug 13 is connected to the AC power line, even if the television set is "turned off." When the television set is turned on switch 20 is closed connecting one end of secondary winding 22 to ground to increase the current supplied to filament 24. With switch 20 open the current supplied to filament 24 is sufficient to maintain the filament in a warm condition so that the application of the normal operating current, by closing switch 23, permits operation of the cathode ray tube without the long warmup period normally required.

A half wave rectifier circuit consisting of filament windings 30 and 31, rectifier 33, switch 34 and the filter consisting of resistor 35 and capacitors 38 and 39 provides a high voltage for use by television receiver 11. Switch 34 is closed when the receiver is turned on permitting application of the high voltage to television receiver 11.

A full wave rectifier circuit consisting of transformer windings 31 and 41, and diodes 43 and 44 supplies power through switch 46 to terminal 47. As shown in FIG. 1, the voltage on terminal 47 can be applied directly to the television receiver or can be coupled through various filter circuits as provided by inductance 51, capacitors 52 and 53, and resistors 54 and 55 and capacitor 56. Additional filtering is provided by resistor 59 and capacitor 58. Power for the very high frequency tuner is provided through switch 60 and resistor 61 as required.

The circuit described above, and without capacitor 50 and resistor 49 coupled to switch terminal 48, provides "instant-on" features for the television set. However, since the set is permanently connected to the power line through transformer 19 high voltage transients appearing on the power line can be coupled through transformer 19 to the rectifying diodes. In order to prevent damage to diodes 33, 43 and 44 a low impedance path for high frequency transient currents is provided by coupling capacitor 50 between terminal 48 and ground. Thus, with switch 46 in the "off" position, that is connected to terminal 48, any transient coupled to transformer 19 will cause current to flow through capacitor 50 and transformer 19. This current flowing through transformer 19 prevents the buildup of extremely high voltages which otherwise could appear across diodes 43 and 44 and also across doide 33. Resistor 49 is used to provide a discharge path for capacitor 50 after a high voltage line transient. Since the power supply output across capacitor 50 is direct current, capacitor 50 presents a high impedance for the direct current supply voltage. Resistor 49 has a relatively high resistance, of the order of 10 k ohms, so that the current through resistor 49 is negligible. Thus the power consumed by the protective circuit is minimal yet the rectifier diodes of the power supply are fully protected so that line transients will not cause their destruction.

Referring to FIG. 2 there is shown another embodiment of a power supply for use with a transistorized television receiver and incororating the "instant-on" feature. AC power is coupled from plug 13 to primary winding 68 of transformer 69 as previously described. Secondary winding 71 provides power to filament 72 of the cathode ray tube. With television receiver 64 turned "off" switch 74 is opened and the current through filament 72 is limited by resistor 73. When the receiver is turned on switch 74 short circuits resistor 73 increasing the current flow through filament 72 to provide the full filament supply current to the cathode ray tube. By providing a reduced filament current to the cathode ray tube while the television receiver is turned "off," the filament is kept warm and the cathode ray tube is operable within a very short time after the set is turned on.

A half wave rectifier circuit including secondary windings 77 and 78, rectifier 80 and a filter consisting of resistor 81 and capacitors 83 and 84, supplies voltage for television receiver 64 through switch 85. The power supply of FIG. 2 also includes a full wave rectifier circuit including secondary windings 78 and 79, rectifiers 87 and 88, and switch 90. With switch 90 closed, that is the television set turned on, the full wave rectifier circuit is complete and current can flow from secondary windings 78 and 79 to the load and return. The power from rectifiers 87 and 88 can be coupled directly to receiver 64 or can be filtered through the filter consisting of inductance 96 and capacitors 98 and 99. Additional filtering is provided by resistor 97 and capacitor 100. Power is coupled to the VHF tuner through a filter consisting of resistor 106 and capacitor 107 and directly through switch 103 and resistor 104.

Without resistor 92 and capacitor 93 in the circuit, diodes 80, 87 and 88 of power supply 65 are subject to damage from high voltage transients which appear on the power line. With the receiver turned "off" switch 90 is open and no current can flow through the secondary windings. This permits the transient pulses to build up high voltages across the diodes. With resistor 92 and capacitor 93 included in the current a low impedance path for transient currents is provided between diodes 87 and 88 and the transformer windings 78 and 79. This permits current to flow through the transformer when a transient is coupled to transformer 69 preventing the buildup of high voltages. Since the buildup of high voltages in the transformer is prevented, diode 80 is protected as well as diodes 87 and 88. Resistor 92 is included in the circuit to lengthen the rise time of the current as switch 90 is closed to prevent arcing at switch 90. Since the power supply output across capacitor 93 is direct current, capacitor 93 presents a high impedance for the direct current supply voltage.

Thus a simple protection circuit for an "instant on" type power supply for a television receiver has been described. A low impedance path is provided in the secondary circuit of the power supply transformer with the television set turned "off" to permit current to flow through the transformer when high voltage transients are coupled thereto. By permitting current to flow through the transformer the build up of high voltages across the rectifying diodes of the power supply is prevented and these diodes are protected from damage.

What is claimed is:

1. A protection circuit for a power supply having an "off" state and an "on" state, including in combination, a power transformer having a primary winding adapted to receive an alternating current power supply voltage which may contain high voltage transient pulses, and a secondary winding, power supply output circuit means, rectifying means coupled to said secondary winding and forming therewith a rectification circuit to develop a direct current output voltage from said alternating current supply voltage, switch means having first and second positions corresponding to said "off" and "on" states, respectively, protection circuit means coupled across at least a portion of said secondary winding by said switch means in said first position for providing a low impedance path for currents developed by said high voltage transient pulses with the power supply in the "off" state, whereby a destructive voltage buildup across said rectifying means is prevented, said rectifying means being coupled to said power supply output circuit means by said switch means in said second position.

2. The circuit of claim 1 wherein, said protection circuit means includes capacitor means coupled across at least a portion of said secondary winding by said switch means in said first position for providing said low impedance path for said currents developed by said high voltage transient pulses.

3. A protection circuit for a power supply having an "off" state and an "on" state, including in combination, a power transformer having a primary winding adapted to receive an alternating current power supply voltage which may contain high voltage transient pulses, and a first secondary winding, rectifying means coupled to said first secondary winding and forming therewith a rectification circuit for developing a direct current output voltage from said alternating current supply voltage protection circuit means coupled between said first secondary winding and said rectifying means, said protection circuit means providing a high impedance path for said direct current output voltage and further providing a low impedance path for currents developed in said first secondary winding by said transient pulses, power supply output circuit means, a switch coupled to said protection circuit means, said rectifying means, and said power supply output circuit means, said switch having a first position with whereby a destructive voltage buildup across said rectifying means is coupled to the protection circuit means whereby a destructive voltage build up across said rectifying means is prevented, and said switch having a second position wherein said rectifying means is coupled to said power supply output circuit means.

4. The power supply protection circuit of claim 3 wherein, said protection circuit means includes capacitor means coupled between said first secondary winding and said rectifying means.

5. The power supply protection circuit of claim 4 wherein, said rectifying means includes first and second diodes each having a first terminal coupled to opposite ends of said first secondary winding and forming therewith a full wave rectifying circuit, and a second terminal, said capacitance means being coupled between said second terminals and said first secondary winding.

6. The power supply protection circuit of claim 4 wherein said first secondary winding includes a center tap thereon, said capacitance means being coupled between said center tap and said rectifying means, and a switch coupled to said center tap and having a normally open first position with the power supply in the "off" state and a second position with the power supply in the "on" state wherein said center tap is connected to a reference potential.

7. The power supply protection circuit of claim 5 wherein said power transformer includes a second secondary winding, and a third rectifier coupled to said second secondary winding to form a single wave rectifier circuit.

8. The power supply protection circuit of claim 4 wherein, said protection circuit means includes resistance means connected across said capacitance means.

9. The power supply protection circuit of claim 6 wherein, said protection circuit means includes resistance means coupled in series with said capacitance means between said center tap and said rectifying means.

References Cited

UNITED STATES PATENTS

| | | | |
|---|---|---|---|
| 3,029,375 | 4/1962 | English et al. | 321—11 |

| | | | |
|---|---|---|---|
| 3,171,083 | 2/1965 | Heffron | 315—101 X |
| 3,171,084 | 2/1965 | Sziklai | 315—101 X |
| 3,337,784 | 8/1967 | Loeder | 307—150 X |

FOREIGN PATENTS

| | | |
|---|---|---|
| 707,060 | 1/1962 | Canada. |

LEE T. HIX, Primary Examiner

W. H. BEHA, Jr., Assistant Examiner

U.S. Cl. X.R.

315—101; 325—494; 328—260